Dec. 14, 1954  R. W. DOUGLAS  2,697,125
ELECTRIC GLASS MELTING FURNACE
Filed Aug. 18, 1953
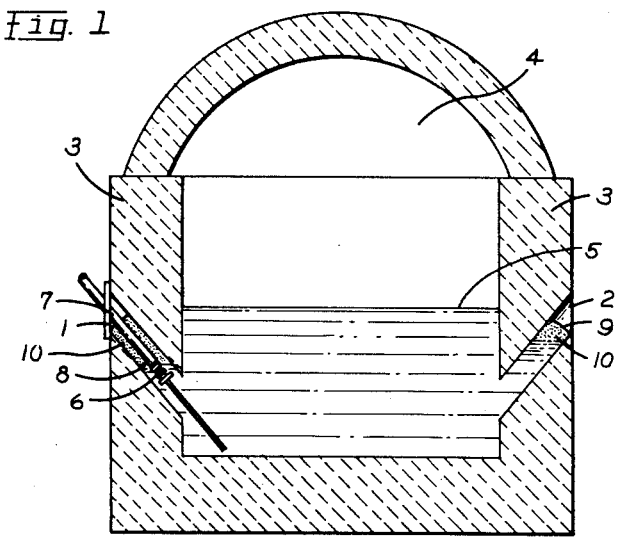
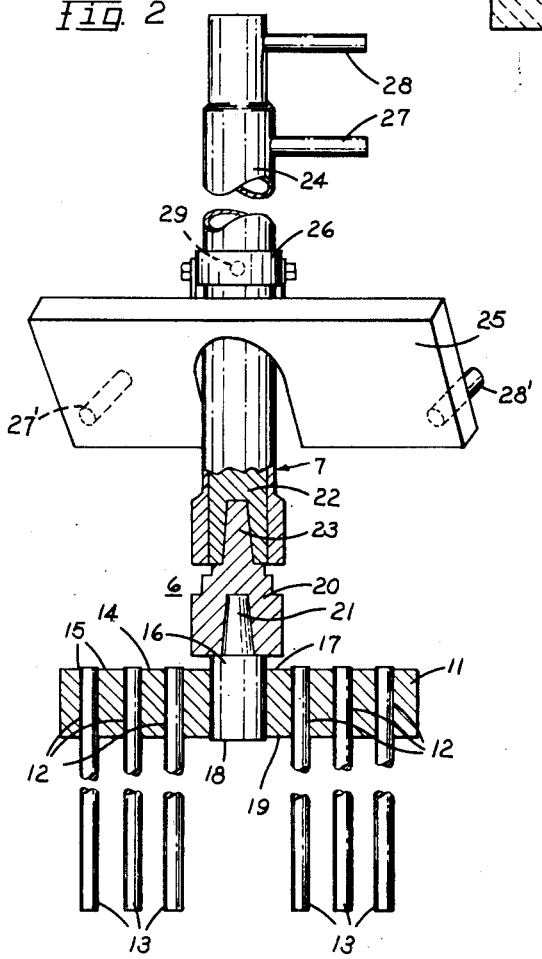
Inventor:
Ronald W. Douglas,
by
His Attorney

United States Patent Office 2,697,125
Patented Dec. 14, 1954

2,697,125

ELECTRIC GLASS MELTING FURNACE

Ronald W. Douglas, Wembley, England, assignor to General Electric Company, a corporation of New York Application August 18, 1953, Serial No. 374,932

Claims priority, application Great Britain September 12, 1952

2 Claims. (Cl. 13—6)

This invention relates to electric glass melting furnaces of the type, usually referred to as "tank" furnaces, comprising a chamber adapted to contain the glass-forming materials during the melting process, two or more apertures being provided in the walls of said chamber for the insertion of immersion electrodes. By the term "immersion electrode" is meant an electrode of the type adapted to be inserted through an aperture in the furnace wall so that, in operation of the furnace, part of the electrode is immersed in molten glass within the furnace chamber and part of it is located within the said aperture and passes therethrough to the outside of the furnace wall.

This invention is concerned with furnaces in which the electrodes are not permanently fixed in the operating position but are insertable into and removable from the furnace as required, and the object of this invention is to provide an arrangement which facilitates the insertion and removal of the electrodes while the tank is full of molten glass.

According to the invention, in an electric glass melting furnace of the type described, the apertures in the walls of the chamber for the insertion of the electrodes are inclined downward through the walls from the external surface to the internal surface thereof, the external or upper end of each aperture being located at or near the level occupied by the surface of the molten glass when the furnace is in full normal operation and the angle of inclination of each aperture being such that an immersion electrode of a sufficient length, when inserted in the aperture, extends near to the floor of the furnace chamber.

Preferably, the glass level in the furnace chamber in full normal operation is approximately the same as the level of the lower edge of the external end of the aperture, or a little above, but not so high in relation to the external end of the aperture that the pressure of molten glass is sufficient to force a large amount of glass out of the aperture.

In operation of a furnace in accordance with the invention, the chamber is first caused to be filled with molten but incompletely founded glass, for example by filling from an external source of molten glass or by melting a charge in the chamber by means of a gas flame, and the electrodes are thereafter inserted. While before insertion of the electrodes the glass in the chamber is molten, the glass in the external end of each aperture is frozen down to a level which is below the level of the surface of the molten glass in the chamber, as a result of atmospheric cooling. When an electrode is to be inserted into the aperture this frozen glass is first melted, for example by means of a blowpipe, and the electrode is then rapidly inserted. An immersion electrode is usually provided with a water cooling arrangement comprising a jacket which surrounds the part of the electrode situated outside the furnace wall when in the operating position and also surrounds a part of the electrode extending within the aperture, so that when cooling water is caused to flow inside this jacket the glass in the upper part of the aperture after insertion of the electrode again solidifies. When the electrode, and hence the cooling system, is withdrawn, molten glass takes its place in the aperture, but this rapidly solidifies again due to atmospheric cooling. If necessary, the cooling of this glass may be accelerated by directing a jet of cold water onto the molten glass at the outer end of the aperture.

The shape of the apertures in any particular furnace is determined by the shape of the electrodes which are to be inserted therein. Immersion electrodes may be of various forms, and the parts which are immersed in molten glass in operation are usually composed of molybdenum, tungsten or graphite. The shanks of the electrodes, which are water cooled and are therefore surrounded by solid glass in the apertures, may be formed of heat-resistant steel. One form of electrode which has been found to be suitable for use in a furnace in accordance with the invention is that described in copending British application No. 23,015/52 comprising a plurality of molybdenum or tungsten rods carried by a rectangular block of molybdenum or tungsten. When electrodes of this type are used the inclined apertures in the furnace walls are of rectangular cross-section, forming slits just large enough to permit passage of the block which forms part of the electrodes.

In addition to facilitating the insertion and removal of the electrodes, the inclined apertures in the furnace of the invention confer the further advantage that the electrodes inserted therein are also inclined, and therefore the surface area of the electrodes presented to the glass in the direction of current flow between each pair of electrodes is greater than is the case with electrodes of a similar form, but disposed horizontally through the furnace walls as has been the usual practice hitherto. Hence, the supply of current to the molten glass is greater and the heating of the glass is accordingly more effective, resulting in the production of better quality glass.

In the drawings,

Fig. 1 shows diagrammatically one form of electric glass melting furnace in accordance with the invention and which represents a transverse section through the furnace; and Fig. 2 shows, partly in section and partly in perspective, a suitable form of immersion electrode.

Referring to Fig. 1 of the drawing, a pair of apertures 1 and 2, inclined to the vertical furnace walls 3 at a suitable angle between 45° and 60°, depending on the depth of glass and length of the electrodes employed, are situated opposite to one another in the sides of the furnace. The level of the surface of the molten glass within the furnace chamber 4 in full normal operation of the furnace is shown at 5. An immersion electrode 6 of molybdenum with a water-cooled steel shank 7 is shown in the operating position in one of the apertures 1. When the electrode is in position and the water-cooling system is operating, the glass in the aperture is frozen at approximately the level shown at 8. The approximate level to which the glass falls back when it solidifies in the aperture when the electrode is withdrawn is shown at 9 in the aperture 2, the solidified glass in both the apertures being indicated by the dotted areas 10. One form of furnace in accordance with this example of the invention is provided with eight apertures, three in each side wall and one at each end, the apertures being in the form of rectangular slits adapted to accommodate electrodes of the form comprising a rectangular block of molybdenum carrying a plurality of molybdenum rods. The eight apertures are not usually all provided with electrodes simultaneously, the number of electrodes used depending upon the nature of the circuit connections to the power supply. Additional apertures are provided in the furnace walls for feeding the charge into the furnace and for the withdrawal of molten glass.

In commencing the operation of the furnace, the glass or glass-forming material in the chamber is initially heated by means of a gas flame, the gas entering the furnace through one end wall and emerging through the roof of the furnace at the other end, the electrodes 6 being inserted after the glass has become molten, as aforesaid, and the founding of the glass being continued by the joint action of the flame heating and heat generated by the passage of electric current through the glass between the electrodes.

One form of electrode suitable for use in the manner described above will now be described in connection with Fig. 2 of the drawings.

The electrode 6 shown in the drawing comprises a rectangular block 11, 4½" in length and 1¼" square in cross section, composed of swaged molybdenum and provided with six cylindrical channels 12 into which are inserted, fitting closely, swaged molybdenum rods 13 each ¼" in diameter, the length of the rods protruding from the block 11 being 7½". The ends of the rods 13 which are inserted through the channels 12 protrude slightly beyond the surface 14 of the block 11 and are welded thereto as shown at 15.

The shank of the electrode is formed in three sections, consisting of a rod 16 of molybdenum, one end of which is inserted into the block 11 through a cylindrical channel 17, the end 18 being welded to the surface 19 of the block, a block 20 of heat-resistant steel into which the other end 21 of the rod 16 is fitted by means of a Morse taper, and a heat-resistant steel rod 22 into which the end 23 of the steel block 20 is also fitted by means of a Morse taper. The rod 22 is provided with a steel cylindrical jacket 24, and a hollow plate 25 is fixed onto the outside of the jacket 24 by means of a clamp 26. The jacket 24 and plate 25 are provided with inlets 27, 27' and outlets 28, 28', respectively, for cooling water. The clamp 26 is fitted with a terminal, indicated at 29, for connection of the electrode to a power supply.

In operation, the electrode is inserted into an aperture 1, 2 in a wall of the glass melting furnace so far that the plate 25 rests against the outside of the furnace wall, the rods 13 and the block 11 being immersed in the molten glass, while the steel parts of the shank are entirely outside the molten glass, the part within the aperture being surrounded by solid glass when cooling water is caused to flow through the hollow plate 25 and the jacket 24.

What I claim as new and desire to secure by Letters Patent of the United States is:

1. An electric glass melting tank comprising vertical walls having apertures therein for the accommodation of electrodes, said apertures being inclined downwardly from the exterior to the interior surfaces of said walls and terminating at their upper ends at approximately the normal level of the molten glass in the tank, and electrodes arranged to extend through said apertures into the interior of the tank and to be readily removable therefrom.

2. An electric glass melting tank comprising vertical walls having apertures therein for the accommodation of electrodes, said apertures being inclined downwardly from the exterior to the interior surfaces of said walls and terminating at their upper ends at approximately the normal level of the molten glass in the tank, and electrodes arranged to extend through said apertures into the interior of the tank and to be readily removable therefrom, the angle of inclination of the apertures and the length of the electrodes being such that the electrodes extend near to the floor of the tank.

References Cited in the file of this patent

UNITED STATES PATENTS

| Number | Name | Date |
| --- | --- | --- |
| 742,419 | Harmet | Oct. 27, 1903 |
| 867,948 | Colburn et al. | Oct. 15, 1907 |
| 1,044,957 | Washburn | Nov. 19, 1912 |
| 2,131,599 | Shrum | Sept. 27, 1938 |
| 2,209,515 | Ehman et al. | July 30, 1940 |

FOREIGN PATENTS

| Number | Country | Date |
| --- | --- | --- |
| 4,031 of 1903 | Great Britain | Feb. 20, 1903 |
| 99,936 | Sweden | Oct. 1, 1940 |